(12) United States Patent
Von Blücher

(10) Patent No.: US 7,354,475 B2
(45) Date of Patent: Apr. 8, 2008

(54) ADSORPTION FILTER MATERIAL AND ITS USE

(75) Inventor: Hasso Von Blücher, Erkrath (DE)

(73) Assignee: Blucher GmbH, Erkrath (DE)

( * ) Notice: Subject to any disclaimer, the term of this patent is extended or adjusted under 35 U.S.C. 154(b) by 329 days.

(21) Appl. No.: 11/126,890

(22) Filed: May 11, 2005

(65) Prior Publication Data

US 2005/0252379 A1 Nov. 17, 2005

(30) Foreign Application Priority Data

May 13, 2004 (DE) ...................... 10 2004 024 075

(51) Int. Cl.
- *A62D 5/00* (2006.01)
- *A62B 17/00* (2006.01)
- *B32B 7/14* (2006.01)

(52) U.S. Cl. ............................ 96/134; 96/135; 96/154; 442/122; 428/198

(58) Field of Classification Search ................. 96/134, 96/135, 153, 154; 427/210, 244; 428/198; 156/277; 442/327, 401, 122, 123
See application file for complete search history.

(56) References Cited

U.S. PATENT DOCUMENTS

| | | | | |
|---|---|---|---|---|
| 3,849,947 A | * | 11/1974 | Bunkoczy | 451/28 |
| 4,217,386 A | * | 8/1980 | Arons et al. | 428/198 |
| 4,374,888 A | * | 2/1983 | Bornslaeger | 428/198 |
| 4,510,193 A | * | 4/1985 | Blucher et al. | 428/196 |
| 4,869,947 A | * | 9/1989 | Kirayoglu | 428/198 |
| 5,112,666 A | * | 5/1992 | Langston | 428/104 |
| 5,731,065 A | * | 3/1998 | Stelzmuller et al. | 428/198 |
| 6,503,856 B1 | * | 1/2003 | Broadway et al. | 442/366 |
| 2003/0118854 A1 | | 6/2003 | Barson et al. | |
| 2004/0237790 A1 | * | 12/2004 | von Blucher et al. | 96/154 |
| 2005/0076541 A1 | * | 4/2005 | von Blucher | 36/113 |
| 2007/0004301 A1 | * | 1/2007 | Heinrich et al. | 442/121 |
| 2007/0059504 A1 | * | 3/2007 | von Blucher | 428/220 |

FOREIGN PATENT DOCUMENTS

| | | |
|---|---|---|
| DE | 39 39 373 A1 | 6/1991 |
| DE | 195 19 869 C2 | 2/2001 |
| DE | 698 09 718.1-08 | 12/2003 |
| DE | 102 61 996 A1 | 3/2004 |
| EP | 0 230 097 A1 | 7/1987 |
| EP | 0 374 426 A | 6/1990 |
| EP | 0 649 332 B1 | 4/1996 |
| EP | 0 966 558 B1 | 11/2002 |
| EP | 1 317 958 A | 6/2003 |
| GB | 2 077 141 A | 12/1981 |
| WO | WO 93/08024 A2 * | 4/1993 |
| WO | WO 94/01198 | 1/1994 |
| WO | WO 98/41678 | 9/1998 |
| WO | WO 01/70372 A1 | 9/2001 |

* cited by examiner

*Primary Examiner*—Frank M. Lawrence
(74) *Attorney, Agent, or Firm*—Woodard Emhardt Moriarty McNett & Henry LLP

(57) ABSTRACT

A gas and water vapor pervious adsorption filter material having a protective function against biological and chemical noxiants and poisons and a multilayered layer construction including a first sheetlike carrier layer, a second sheetlike carrier layer and, interposed between the first carrier layer and the second carrier layer, an adsorbing layer, the adsorbing layer comprising an activated carbon fiber fabric which is durably adhered to the first carrier layer and to the second carrier layer by means of an adhesive.

12 Claims, 1 Drawing Sheet

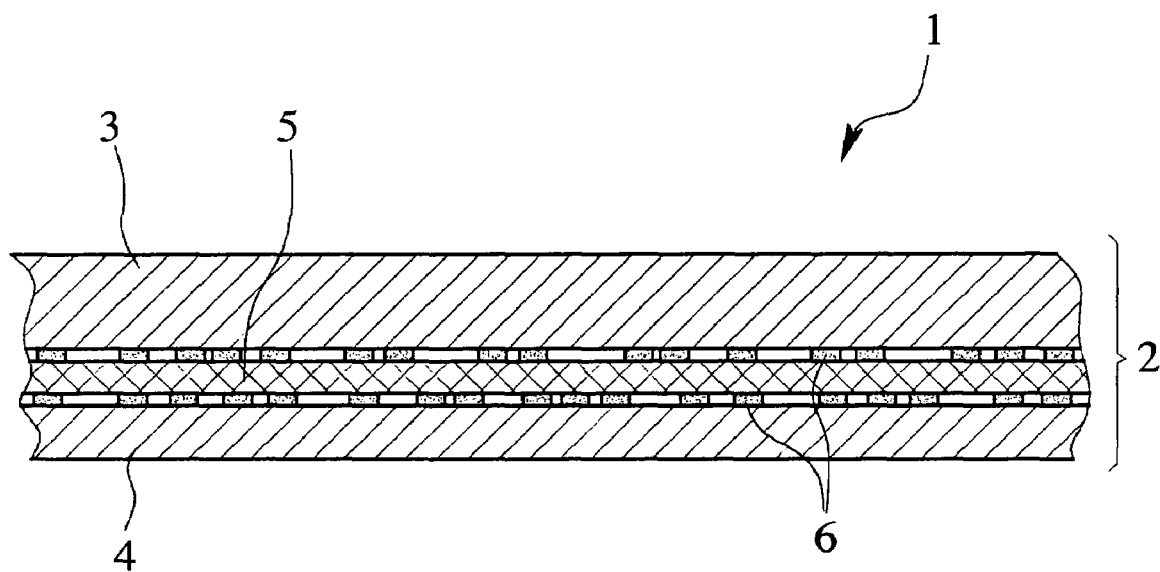

ADSORPTION FILTER MATERIAL AND ITS USE

REFERENCE TO RELATED APPLICATION

The present application claims the benefit of German Patent Application Serial No. DE 10 2004 024 075.2, filed May 13, 2004, which is hereby incorporated by reference in its entirety.

BACKGROUND OF THE INVENTION

The present invention relates in general to an adsorption filter material that is suitable for the production of protective materials of any kind, such as protective suits, protective gloves, protective footwear and other protective garments and also protective covers (for example to transport casualties), sleeping bags and the like, not only for the military sector but also for the civilian sector, especially for NBC deployment.

There are a whole series of chemical noxiants which are absorbed by the skin and lead to serious physical harm. Examples include the vesicatory mustard agent (Yellow Cross) and the nerve agent sarin. People likely to come into contact with such poisons must wear suitable protective apparel or be protected against these poisons by suitable protective materials.

Protective materials known for this purpose include for example air and water vapor impervious protective suits which are equipped with a layer of rubber impervious to chemical poisons. The disadvantage here is that these suits very rapidly lead to a heat buildup, since they are air and water vapor impervious.

Protective suits against chemical warfare agents that are intended for prolonged use under a wide variety of conditions, however, must not lead to heat buildup for the wearer. Air and water pervious protective suits are known for this purpose because they offer the highest wear comfort.

The air pervious, permeable protective suits generally possess an absorption filter layer based on activated carbon which binds the chemical poisons very durably, so that even badly contaminated suits cannot pose any danger to the wearer. The great advantage of such systems is that the activated carbon is accessible on the inside as well as the outside, so that poisons which have succeeded in penetrating at damaged or otherwise non-tight locations can be very rapidly adsorbed.

The adsorbing layer in the air pervious, permeable protective suits described above can in this case be engineered such that for example either activated carbon particles up to about 1.0 mm in size on average, especially granules or spherules of activated carbon, are bonded to a small heap of adhesive printed onto a textile carrier material, or else a reticulated polyurethane foam impregnated with a "carbon paste" (i.e., binder plus activated carbon) is used as an adsorbing layer, in which case the adsorbing layer is generally complemented by an outer, i.e., covering material, and the wearer-facing inside surface is covered by a lightweight textile material.

But there are also assemblage materials comprising an activated carbon fiber fabric, for example a woven or a nonwoven batt fabric of activated carbon fiber.

For instance, WO 94/01198 A1, entitled "Mutilayered, Gas-Permeable Textile Filtering Material Against Toxic Chemical Substances", by inventors Stelzmüller et al, published Jan. 20, 1994, or its equivalent EP 0 649 332 B1, issued Apr. 17, 1996, describes a multi-ply textile adsorption filter material against harmful chemicals, which comprises two outer textile carrier layers and an interposed woven activated carbon fiber fabric which is uniformly adhered to the two outer layers in order that adequate mechanical stability may be ensured for the woven activated carbon fiber fabric even under extreme mechanical stress of the kind encountered in the wearing of protective suits for example. Disadvantages here are the large amount of adhesive needed for the uniform adhesive bond and the consequently elevated basis weight of the resulting adsorption filter material, and also the stiffness due to the uniform adhesive bond. A particular disadvantage is the air imperviousness which results from the uniform adhering of the woven activated carbon fiber fabric to the two textile outer layers and which, according to WO 94/01198 A1 or EP 0 649 332 B1, has to be compensated by having to introduce small perforations into the uniform add-on of adhesive.

EP 0 230 097 A2, entitled "Needled Layered Material Containing Activated Carbon Fibres", by inventor Keith Simpson, published Jul. 29, 1987, Bulletin 87/31, describes the failed attempt to produce a stable assemblage material in the form of a laminate from two outer textile plies and an interposed layer of woven activated carbon fiber fabric adhered to the two outer plies. The materials produced in this way are incapable of withstanding any mechanical stress and the woven activated carbon fiber fabric disintegrates into a fine dust when exposed to mechanical stress (cf. EP 0 230 097 A2 page 1 line 25 to page 2 line 8).

The present invention is directed to providing an adsorption filter or protective material which may substantially or completely avoid but, at a minimum, lessens the above-described disadvantages of the prior art and is useful in particular for the production of nuclear, biological, and chemical warfare (NBC) protective materials, such as protective suits, protective gloves, protective footwear and other protective garments and also protective covers, sleeping bags and the like.

The present invention is further directed to providing an adsorption filter material which, as well as having good gas and water vapor perviousness, provides a protective function against chemical and biological noxiants and poisons, especially chemical and biological warfare agents. A certain degree of weight saving on the part of the adsorption filter material is desired too.

The present invention is further directed to providing an adsorption filter material, especially for use in protective materials, such as protective suits, protective gloves, protective footwear and other protective garments and also protective covers, sleeping bags and the like, that ensures a high wear comfort.

The present invention further provides protective materials, especially protective suits, protective gloves, protective footwear and other protective garments and also protective covers, sleeping bags and the like, produced using the adsorption filter material of the present invention or comprising the adsorption filter material of the present invention.

The present invention finally further provides for the use of the present invention's adsorption filter material for producing protective materials of any kind, such as protective suits, protective gloves, protective footwear and other protective garments and also protective covers, sleeping bags and the like, preferably for NBC deployment, not only for civilian but also for military applications.

SUMMARY OF THE INVENTION

A first aspect of the present invention according to the disclosed embodiments provides a gas and water vapor pervious adsorption filter material having a protective function against biological and chemical noxiants and poisons, especially biological and chemical warfare agents, the adsorption filter material comprising a multilayered layer construction having a first and especially sheetlike carrier layer and a second and especially sheetlike carrier layer and also, interposed between these two carrier layers, an adsorbing layer. The adsorbing layer in this case comprises an activated carbon fiber fabric which is durably adhered to the two outer carrier layers, wherein the adhering of the activated carbon fiber fabric to the two carrier layers is in each case provided or effected through the application of adhesive in the form of noncohering adhesive dots.

One object of the present invention is to provide an improved adsorption filter material.

Related objects and advantages of the present invention will be apparent from the following description.

BRIEF DESCRIPTION OF THE DRAWING

FIG. 1 is a partial, diagrammatic representation, as a side elevational section, of an adsorption filter material according to a typical embodiment of the present invention.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a gas and water vapor pervious adsorption filter material 1 having a protective function against biological and chemical noxiants and poisons and especially against biological and chemical warfare agents that is in accordance with the present invention. The adsorption filter material 1 comprises a multilayered layer construction 2 comprising a first and especially sheetlike carrier layer 3 and a second and especially sheetlike carrier layer 4 and also, interposed between the first carrier layer 3 and the second carrier layer 4, an adsorbing layer 5. The adsorbing layer 5 comprises an activated carbon fiber fabric durably adhered to the first carrier layer 3 and the second carrier layer 4 by means of an adhesive 6. The peculiarity of the present invention then is in particular that the adhering of the activated carbon fiber fabric to the two outer carrier layers 3, 4 is in each case effected through a discontinuous application of adhesive in the form of individual dots of adhesive 6 which do not cohere, i.e., are spatially separate from one another and are not connected to one another. The term "dots" of adhesive refers in particular to tiny little droplets or heaps of adhesive applied atop the plies or layers to be adhered, without touching one another.

In the context of the present invention, Applicant has found that, unexpectedly, a mechanically stable adsorption filter material of high flexibility can be produced even when the activated carbon fiber fabric forming the core layer is only spot adhered to the two outer carrier layers.

This not only provides a very gas and water vapor pervious adsorption filter material of high mechanical strength, but also, because of the only discontinuous, spot- or dotwise application of adhesive, achieves a distinctly reduced basis weight and a distinctly enhanced flexibility and accordingly a distinctly enhanced wear comfort for the resulting adsorption filter material. The discontinuous application of the adhesive, moreover, covers only a small proportion of the surface of the activated carbon fiber fabric, so that the predominant portion of the surface of the activated carbon fiber fabric is freely accessible to the chemical and biological noxiants and poisons to be adsorbed, so that adsorption capacity and efficiency is also distinctly enhanced by the discontinuous application of adhesive.

To ensure not only good gas and water vapor perviousness but also good flexibility on the part of the present invention's adsorption filter material 1, the adhesive 6 only covers the activated carbon fiber fabric of the absorbing layer 5 to not more than 30%, especially to not more than 25%, preferably to not more than 20% and most preferably to not more than 15%, all based on one side or surface of the activated carbon fiber fabric. In other words, each of the two sides or surfaces of the activated carbon fiber fabric is not less than 70%, especially not less than 75%, preferably not less than 80% and most preferably not less than 85% free of adhesive and thus freely accessible to the biological and chemical noxiants and poisons to be adsorbed. This ensures good adsorption efficiency and capacity. None the less, the assemblage is sufficiently robust to withstand the mechanical stresses of wear. In general, to produce a robust and mechanically strong assemblage, it is sufficient for the adhesive to have been applied in such amounts that it covers the activated carbon fiber fabric only to an extent in the range from 5% to 30%, especially in the range from 10% to 25% and preferably in the range from 10% to 20%, all based on one of the two sides or surfaces of the activated carbon fiber fabric.

For this purpose, the adhesive 6 is generally applied at a basis weight (dry weight) in the range from 5 to 30 g/m$^2$, especially in the range from 5 to 25 g/m$^2$ and preferably in the range from 10 to 20 g/m$^2$, all based on one of the two sides or surfaces of the activated carbon fiber fabric. The aforementioned particulars are all based on one of the two sides or surfaces of the activated carbon fiber fabric; total application of adhesive based on the entire activated carbon fiber fabric, i.e., on both sides or surfaces of the activated carbon fiber fabric, is consequently twice as high.

Advantageously, the adhesive 6 has been printed onto the carrier layers 3, 4 and/or the activated carbon fiber fabric of the adsorbing layer 5, especially in the form of an irregular grid or pattern such that any lane formation and thus any penetration of biological and chemical noxiants and poisons through the adsorbing layer 5 is avoided in the use state of the adsorption filter material 1. In general, such grids or patterns can be calculated and applied with computer assistance or under computer control (known as CP adhesive grid or computer point adhesive grid). This is well known to one skilled in the art.

The adhesive 6 to attach the activated carbon fiber fabric to the two carrier layers 3, 4 can be printed for example through a screen whose clear diameter of holes for the application of adhesive 5 is in the range from 5 to 1000 μm, especially in the range from 100 to 575 μm and preferably in the range from 100 to 300 μm; this is the smallest hole diameter through which the adhesive is forced when applied through the screen. Owing to the properties of the adhesive, especially its viscosity, and the properties of the substrates to be adhered together (i.e., carrier layers 3, 4 and activated carbon fiber fabric or absorbing layer 5) especially their surface tension and their wetability by the adhesive, and also the contact pressure with which the individual layers are laminated to form an assemblage, the dots of adhesive present in the ready-produced adsorption filter material 1 on the substrates to be adhered together are distinctly larger than the clear hole diameter of the application screen; the size of the dots of adhesive can vary within wide limits and is generally between 100 and 10,000 µm and especially between 500 to 5,000 µm, based on the average diameter of a dot of adhesive.

With regard to the adhesive as such, any adhesive which is known to one skilled in the art and which is used for this purpose can be used. Thermoplastic adhesives are particularly suitable. Likewise of particular suitability are reactive and especially isocyanate-reactive adhesives which lead to polyurethane-based adhesive bonds after crosslinking and curing.

With regard to the activated carbon fiber fabric used according to the present invention for adsorbing layer 5, it generally has a basis weight in the range from 20 to 200 g/m$^2$, especially in the range from 50 to 150 g/m$^2$, preferably in the range from 80 to 120 g/m$^2$ and more preferably in the range from 90 to 110 g/m$^2$ in order to ensure not only adequate mechanical stability coupled with good flexibility and high wear comfort but also good adsorption capacity and efficiency. For this purpose, the activated carbon fiber fabric used according to the present invention generally has a thickness in the range from 0.1 to 10 mm, especially in the range from 0.2 to 0.8 mm and preferably in the range from 0.3 to 0.5 mm.

The activated carbon fiber fabric used according to the present invention can be for example a woven fabric, a loop-formingly knitted fabric, a loop-drawingly knitted fabric, a scrim, a batt, a nonwoven or a composite of activated carbon fibers. The activated carbon fiber fabric is preferably a woven activated carbon fiber fabric as this produces the best results for the present invention.

Particularly good mechanical stabilities coupled with high adsorption capacity and efficiency are achieved when the activated carbon fibers of the activated carbon fiber fabric consist of carbonized and activated cellulose and/or of carbonized and activated polyacrylonitrile. Particularly good results are achieved with activated carbon fibers consisting of carbonized and activated polyacrylonitrile which ensure the best mechanical stability.

The mechanical stability of the activated carbon fiber fabric can be further increased by using an activated carbon fiber fabric which consists of continuous filament fibers. Continuous filament fibers are in particular virtually endless fibers which are industrially manufactured in various ways and form a constituent of textile articles of manufacture in accordance with German standard specification DIN 60 001 Part 2 (October 1990). For further details with regard to this matter, reference can be made for example to Römpp Chemielexikon, 9th edition, Volume 2, 1997, page 1336, headword: "Filament". Although spun fibers can in principle be used in the present invention, filament fibers are preferred according to the present invention for the aforementioned reasons, especially because of the improved mechanical stability.

The mechanical stability of the adsorption filter material according to the present invention can be further improved by using activated carbon fibers having a linear density of not less than 0.9 denier, especially of not less than 1.0 denier, preferably of not less than 1.1 denier, more preferably in the range from 0.8 to 1.2 denier and even more preferably in the range from 1.0 to 1.2 denier.

To ensure good mechanical stability, the activated carbon fibers of the activated carbon fiber fabric generally have a linear density in the range from 1.0 to 2.0 g/m, especially in the range from 1.2 to 1.8 g/m and preferably in the range from 1.4 to 1.6 g/m.

Preferably, the activated carbon fibers of the activated carbon fiber fabric possess a tensile or breaking strength of more than 1.6 g/denier and preferably of more than 1.8 g/denier. The breaking extension or maximum extensibility of the activated carbon fibers of the activated carbon-fiber fabric is preferably more than 8%, based on their original length. This ensures good mechanical load-bearing capacity.

To increase the wear comfort on the one hand and to improve the extensibility/strength properties of the activated carbon fibers of the activated carbon fiber fabric on the other, the activated carbon fibers have a certain moisture content, which is generally in the range from 5% to 15%, based on weight of activated carbon fiber.

It is preferable for the aforementioned reasons when the activated carbon fibers of the activated carbon fiber fabric have a density of not less than 1.2 g/cm$^3$, especially of not less than 1.3 g/cm$^3$ and preferably of not less than 1.4 g/cm$^3$, and of up to 2.0 g/cm$^3$.

To be particularly useful for military as well as civilian duty, it is advantageous when the activated carbon fibers of the activated carbon fiber fabric are of low flammability and more particularly have a Limiting Oxygen Index (LOI) of not less than 50%. The flame-retarding properties can be further enhanced, either by adding flame retardants to the activated carbon fibers or else by impregnating the activated carbon fibers with flame retardant.

To ensure good adsorption performance and efficiency, the activated carbon fibers of the activated carbon fiber fabric should have an internal surface area (BET) of not less than 800 m$^2$/g, especially of not less than 900 m$^2$/g, preferably of not less than 1000 m$^2$/g, more preferably in the range from 800 to 2000 m$^2$/g and especially in the range from 1000 to 1500 m$^2$/g.

Activated carbon fiber fabrics which have the aforementioned properties and are useful in the present invention are commercially available. For example, materials useful in the present invention are offered by CCTeks (Challenge Carbon Technology Co., Ltd.) and TCT Taiwan Carbon Technologies, Taiwan.

Activated carbon fiber fabrics useful in the present invention can also be produced according to WO-A-98/041678, entitled "Method for Producing an Activated Carbon Fibre Texture", by inventors Philippe Parmentier, et al., published Sep. 24, 1998, or its equivalent EP 0 966 558 B1, published Nov. 27, 2002 in Bulletin 2002/48, or DE 698 09 718 T2, published Dec. 18, 2003, or according to WO-A-01/70372, entitled "Filtering Component in the Form of Activated Carbon Fibres, by inventor Jean-Jacques Ouvry, published Sep. 27, 2001, the entire disclosure content of the aforementioned publications being expressly incorporated by reference herein.

To increase the adsorption efficiency or performance, the adsorbing layer 5 or the activated carbon fiber fabric of the adsorbing layer 5 may be impregnated with one or more catalysts. Examples of catalysts useful in the present invention are enzymes and/or metals, especially metal ions, preferably ions of copper, of silver, of cadmium, of platinum, of palladium, of zinc and/or of mercury. The amount of catalyst(s) can vary within comparatively wide limits; in general it will be in the range from 0.05% to 12% by weight, preferably in the range from 1% to 10% by weight and more preferably in the range from 2% to 8% by weight, based on the activated carbon fiber fabric.

With regard to the first and second carrier layers 3, 4 of the adsorption filter material of the present invention, these are generally constructed as textile carrier layers and especially as textile fabrics. Examples thereof are wovens, formed-loop knits, drawn-loop knits, scrims, batts, nonwovens, textile composite materials and the like. It is particularly advantageous when the first carrier layer 3 and the second carrier layer 4 have different basis weights.

The adsorption filter material 1 of the present invention is advantageously present as a conjugated material and especially as a laminate where the individual layers or plies are laminated with or to one another. This can be accomplished in a conventional manner.

The present invention's embodiment of the adsorption filter material according to the present invention achieves an excellent permeation resistance to chemical warfare agents. The permeation resistance offered by the adsorption filter material of the present invention to chemical warfare agents, especially bis[2-chloroethyl] sulfide (also known as mustard gas, Hd or Yellow Cross) when measured according to CRDEC-SP-84010, method 2.2, allows not more than 4 $\mu g/cm^2$ per 24 h, especially not more than 3.5 $\mu g/cm^2$ per 24 h, preferably not more than 3.0 $\mu g/cm^2$ per 24 h and more preferably not more than 2.5 $\mu g/cm^2$ per 24 h.

Gas perviousness and especially air perviousness, and also water vapor perviousness are equally of particular importance for the adsorption filter material of the present invention, since these properties have a direct bearing on the wear comfort of the protective materials produced therewith and hence also on the length of time for which the protective material can be utilized in the use state. Preference is given to a German standard specification DIN 53887 air perviousness of more than 50 $l/m^2$ per second, preferably of more than 100 $l/m^2$ per second, especially of more than 150 $l/m^2$ per second, more preferably of more than 200 $l/m^2$ per second and most preferably of more than 300 $l/m^2$ per second for the adsorption filter material of the present invention. The preference is for a water vapor transmission resistance $R_{et}$ to DIN EN 31092: 1993 of February 1994 (see above) of less than 10 $(m^2 \cdot pascal)/watt$, especially less than 8 $(m^2 \cdot pascal)/watt$, preferably less than 4 $(m^2 \cdot pascal)/watt$ and most preferably less than 3 $(m^2 \cdot pascal)/watt$. With the same objective, the preference is for a water vapor transmission rate in accordance with the aforementioned DIN EN 31092 of not less than 10,000 $g/m^2$ in 24 h, especially of not less than 12,500 $g/m^2$ in 24 h and most preferably of not less than 15,000 $g/m^2$ in 24 h or more.

The adsorption filter material of the present invention generally has an overall basis weight of about 50 to 900 $g/m^2$, especially in the range from 150 to 500 $g/m^2$ and preferably in the range from 200 to 400 $g/m^2$.

The adsorption filter material of the present invention further has the advantage that it is washable and readily decontaminable, so that it is suitable for frequent deployment. The term "decontaminability" in the context of the present invention is to be understood as meaning in particular that the fractions of adsorbed harmful poisons which are held back or adsorbed by the adsorption filter material are removable down to an acceptable level under conditions which leave the adsorption filter material essentially unimpaired in its function and thus permit renewed use.

Apart from the aforementioned layers or plies 2, 3, 4 and 5, the adsorption filter material 1 of the present invention may additionally comprise further layers or plies which are not depicted in FIG. 1. These further layers or plies can be bonded to the other layers of the layer construction or laid loosely or unsecuredly thereover. These further layers or plies can adjoin or be secured to the outer carrier layers 3 and/or 4, or else be interposed between the carrier layers 3 and/or 4 and the adsorbing layer 5. The additional layers or plies can be for example further textile layers, membranes, etc.

For example, the adsorption filter material of the present invention may comprise, as an additional layer, an at least essentially water and gas impervious but water vapor pervious membrane which retards the penetration of chemical and biological noxiants and poisons or is constructed to be at least essentially impervious to chemical and biological noxiants and poisons. This membrane can be for example a continuous, especially uninterrupted or at most microporous membrane. The thickness of the membrane can be in general in the range from 1 to 500 μm, especially in the range from 1 to 250 μm, preferably in the range from 1 to 100 μm, more preferably in the range from 1 to 50 μm, even more preferably in the range from 2.5 to 30 μm, and most preferably in the range from 5 to 25 μm. To increase the wear comfort and especially the breatheability, the membrane, when measured at 25° C. and a thickness of 50 μm, has a high water vapor transmission rate of not less than 12.5 $l/m^2$ per 24 h, especially of not less than 17.5 $l/m^2$ per 24 h and preferably of not less than 20 $l/m^2$ per 24 h or more (measured by the Inverted Cup Method of ASTM E 96 and at 25° C.) (for further details concerning the measurement of the water vapor transmission rate [WVTR] cf. also McCullough et al. "A comparison of standard methods for measuring water vapour permeability of fabrics" in *Meas Sci. Technol. [Measurements Science and Technology]* 14, 1402-1408, August 2003); this ensures a particularly high wear comfort. For reasons of breatheability, the membrane should have a low water vapor transmission resistance Ret under steady state conditions—measured according to DIN EN 31092: 1993 of February 1994 ("Textiles—Physiological Effects, Measurement of Heat and Water Vapor Transmission Resistance under Steady State Conditions [sweating guarded hotplate test]") or according to the equivalent international standard ISO 11 092—is at 35° C. not more than 30 $(m^2 \cdot pascal)/watt$, especially not more than 25 $(m^2 \cdot pascal)/watt$ and preferably not more than 20 $(m^2 \cdot pascal)/watt$ when the membrane is 50 μm thick. Owing to the multiplicity of layers in the layer construction, the water vapor transmission resistance $R_{et}$ of the adsorption filter material as a whole—compared with the membrane alone—is slightly higher. In general, the water vapor transmission resistance $R_{et}$ of the adsorption filter material as a whole—with a membrane included—is not more than 30 $(m^2 \cdot pascal)/watt$, especially not more than 25 $(m^2 \cdot pascal)/watt$, and preferably not more than 20 $(m^2 \cdot pascal)/watt$ when the membrane is 50 μm thick. A membrane of the aforementioned kind can consist for example of a plastics material or a polymeric material or comprise such. A plastics material or such a polymer can be suitably selected for example from the group of polyurethanes, polyetheramides, polyesteramides, polytetrafluoroethylenes and/or polymers based on cellulose and also derivatives of the aforementioned compounds. In a particular embodiment, the optional membrane can be constructed as a multilayered membrane laminate or as a multilayered membrane composite which can each consist of two or more and preferably three or more interconnected membrane layers or plies. Various membrane materials can be combined in this way.

As mentioned above, the adsorption filter material of the present invention can be produced in a conventional manner. This is well known to those skilled in the art of adsorption filter material manufacture, so that no further particulars are required here. For example, the adhesive used can be applied in the aforementioned amounts and the aforementioned manner atop the two carrier layers 3 and 4, so that these can subsequently be bonded or laminated to the adsorbing layer 5, which comprises the activated carbon fiber fabric.

Further refinements, modifications and variations of the present invention will become apparent to and realizable by the ordinarily skilled after reading the description without their having to depart from the realm of the present invention.

What is claimed is:

1. A gas and water vapor pervious adsorption filter material having a protective function against biological and chemical noxiants and poisons, especially biological and chemical warfare agents, the adsorption filter material comprising a multilayered layer construction having;
    a sheetlike first carrier layer;
    a sheetlike second carrier layer; and
    an adsorbing layer interposed between the first carrier layer and the second carrier layer, said adsorbing layer comprising an activated carbon fiber fabric which consists of continuous filament fibers of carbonized and activated polyacrylonitrile which is adhered to the first carrier layer and the second carrier layer by means of a thermoplastic adhesive,
    wherein the activated carbon fiber fabric is adhered to said first carrier layer and to said second carrier layer by noncohering adhesive dots applied on both sides of said activated carbon fiber fabric, the adhesive covering the activated carbon fiber fabric to not more than 20% based on one side of the activated carbon fiber fabric;
    wherein the adhesive has been printed onto the activated carbon fiber fabric in the form of an irregular grid or pattern calculated and applied under computer control such that any lane formation is avoided in the use state of the adsorption filter material; and
    wherein the adhesive has been applied by printing through a screen whose clear diameter for the application of adhesive is in the range of from 50 to 1000 μm.

2. The adsorption filter material according to claim 1, wherein the adhesive has been applied at a basis weight, based on dry weight, in the range from 5 to 30 g/m$^2$, based on one side of the activated carbon fiber fabric.

3. The adsorption filter material according to claim 1, wherein the activated carbon fiber fabric has a basis weight in the range from 20 to 200 g/m$^2$.

4. The adsorption filter material according to claim 1, wherein the activated carbon fiber fabric has a thickness in the range from 0.1 to 10 mm.

5. The adsorption filter material according to claim 1, wherein the activated carbon fibers of the activated carbon fiber fabric have a linear density of 0.8 to 1.2 denier.

6. The adsorption filter material according to claim 1, wherein the activated carbon fibers of the activated carbon fiber fabric have a moisture content in the range from 5% to 15%, based on weight of fiber, and wherein the activated carbon fibers of the activated carbon fiber fabric have a tensile strength of more than 1.5 g/denier and wherein the activated carbon fibers of the activated carbon fiber fabric have a breaking extension of more than 8%.

7. The adsorption filter material according to claim 1, wherein the activated carbon fibers of the activated carbon fiber fabric have a linear density in the range from 1.0 to 2.0 g/m.

8. The adsorption filter material according to claim 1, wherein the activated carbon fibers of the activated carbon fiber fabric are of low flammability with a Limiting Oxygen Index (LOI) of not less than 50%.

9. The adsorption filter material according to claim 1, wherein the activated carbon fibers of the activated carbon fiber fabric are impregnated with one or more catalysts, the catalysts being selected from the group of enzymes and metal ions, including ions of copper, of silver, of cadmium, of platinum, of palladium, of zinc and/or of mercury; the amount of catalyst being in the range from 0.05% to 12% by weight, based on weight of fibers.

10. The adsorption filter material according to claim 1, wherein the activated carbon fibers of the activated carbon fiber fabric have an internal surface area (BET) in the range from 800 to 2000 m$^2$/g.

11. A protective material article for use by a person for covering a portion of the person's anatomy, said protective material article comprising:
    adsorption filter material according to claim 1.

12. A gas and water vapor pervious adsorption filter material having a protective function against biological and chemical noxiants and poisons, especially biological and chemical warfare agents, the adsorption filter material comprising a multilayered layer construction having:
    a sheetlike first carrier layer;
    a sheetlike second carrier layer; and
    an adsorbing layer interposed between the first carrier layer and the second carrier layer, said adsorbing layer comprising an activated carbon fiber fabric which is adhered to the first carrier layer and the second carrier layer by means of an adhesive,
    wherein the activated carbon fiber fabric is adhered to said first carrier layer and to said second carrier layer by noncohering adhesive dots; and
    wherein the activated carbon fibers of the activated carbon fiber fabric consist of carbonized and activated cellulose and carbonized and activated polyacrylonitrile.

* * * * *